125,261

UNITED STATES PATENT OFFICE.

REVERE M. BREINIG, OF BROOKLYN, NEW YORK.

IMPROVEMENT IN COMPOUNDS FOR PAINT AND PUTTY.

Specification forming part of Letters Patent No. 125,261, dated April 2, 1872.

*To all whom it may concern:*

Be it known that I, REVERE M. BREINIG, of Brooklyn, in the county of Kings and State of New York, have invented a new and Improved Compound for Paint and Putty; and I do hereby declare the following to be a full, clear, and exact description thereof, which will enable those skilled in the art to make and use the same.

My invention consists in a combination of oleate of lead or zinc, of linseed-oil and oleate of lead or zinc, of cotton-seed oil with a pigment for paint, or with whiting or pulverized marble for putty.

In carrying out my invention, I prepare an oleate of lead or zinc from cotton-seed oil, and also from linseed-oil, in the following manner: I saponify the oil with an alkali, and with the pasty saponified substance I mix a solution of any metallic salt, the metallic base of which will unite with the fatty acid and separate the alkali; or I take the oil and mix with it any metallic oxide in powder, such as litharge or white lead, and boil it, mixed, with a small quantity of water, till a combination is formed between the fatty acid and the metallic oxide. After the metallic soaps or oleates have been prepared, I take of the oleate prepared from linseed-oil, two hundred pounds, and of the oleate prepared from cotton-seed oil, fifty pounds, and place them together in a vessel or tank containing a lead coil, through which I pass live steam, by which I can heat the metallic oleate to a heat of 200° Fahrenheit. I continue this heat until all the water contained in the metallic soap is passed off. I now add, first, twenty gallons of yellow refined cotton-seed oil and twenty gallons of raw oil, and heat again to 200°. Then I add forty gallons of raw oil and forty gallons refined cotton-seed oil, and heat again to 200°. Then I gradually add one gallon of oil at a time, keeping the heat at 200°, as near as possible, until I have added forty gallons yellow refined cotton-seed oil and twenty gallons raw linseed-oil additional, keeping up the heat of 200° for a considerable time, until no steam will pass off, showing that all water has passed off. I now pass the mixture to a tank to cool, and, when cold, I take it and combine it with whiting or powdered marble, from two to three gallons to the hundred pounds, by a chaser or any other powerful mixing apparatus. After the compound is well mixed and incorporated to the consistency of glaziers' putty, I place it in suitable packages for the market.

When my compound is to be used for paint, I prepare it as follows: I take two hundred pounds of metallic soap, made from refined cotton-seed oil, place it in a tank containing a heating coil, and raise the temperature to 200°, continuing this heat until all the water has passed off. Then I add twenty-five gallons refined linseed-oil and twenty-five gallons refined white cotton-seed oil, and heat it to 200°. Then I add twenty-five gallons of refined linseed-oil, and sixty-five gallons refined cotton-seed oil, and twenty pounds anhydrous sulphate of zinc, and bring the mass to a temperature of 200°, retaining this temperature until all the water has been expelled. I now draw off the mixture into a suitable tank to cool, and when cold I take any of the dry pigments, place it into the ordinary mixing-tubs, and add sufficient of the above mixture, so that the whole can be ground in a mill. When ground I put it up in kegs for the market.

It will be noticed that, in my compound, oleate of lead or zinc from linseed-oil, and a similar oleate from cotton-seed oil, are used. The reasons for doing so are as follows: The metallic oleate prepared from cotton-seed oil is of a light color, and it has no discoloring effect on white lead or on whiting or marble-dust, but at the same time it is wanting in body, while the metallic oleate from linseed-oil has sufficient body, but it is dark and it affects the color of the pigment or putty. By using the metallic oleate of cotton-seed oil in conjunction with that of linseed-oil I am enabled to retain the good qualities of either of the oleates, while the bad qualities of one are counteracted by those of the other.

I disclaim everything described in the patent of D. E. Breinig dated January 27, 1867, and reissued September 19, 1871; but

What I claim as new, and desire to secure by Letters Patent, is—

A compound for paint or putty, made of metallic oleates of cotton-seed oil and of linseed-oil, and mixed with suitable pigments or with whiting or marble-dust, substantially in the manner, and about in the proportion herein specified.

This specification signed by me this 27th day of February, 1872.

REVERE M. BREINIG.

Witnesses:
W. HAUFF,
E. F. KASTENHUBER.